Dec. 11, 1923.
1,476,983
P. J. KING
APPARATUS FOR CUTTING PIPES
Filed April 26, 1921
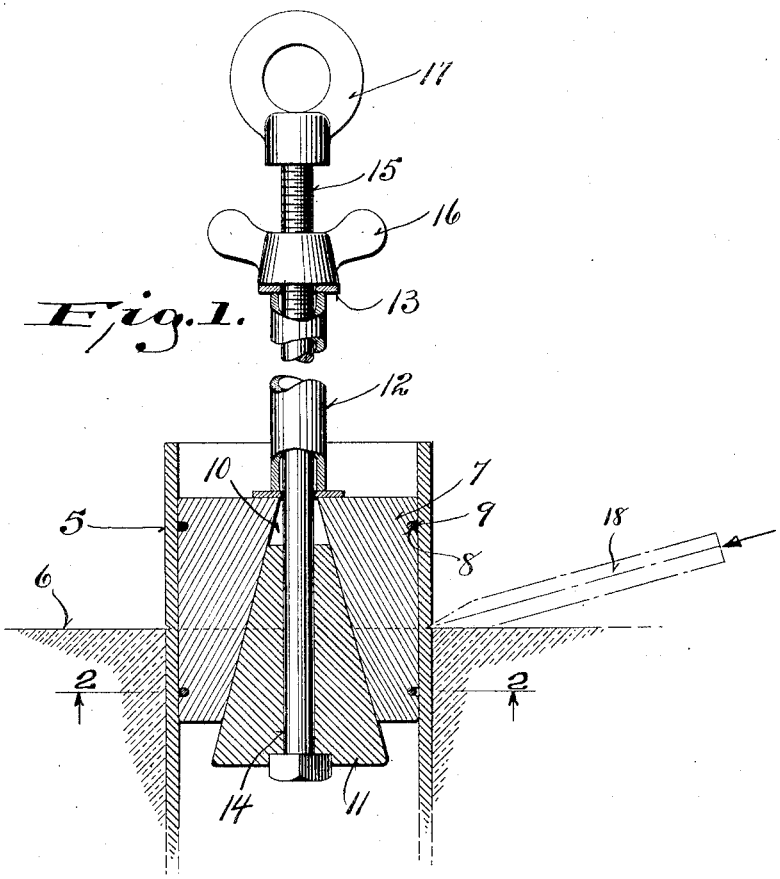
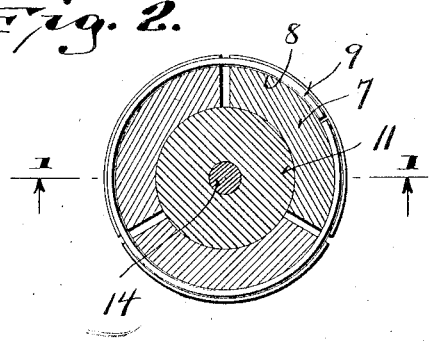
Inventor:
Peter J. King Patented Dec. 11, 1923.

1,476,983

UNITED STATES PATENT OFFICE.

PETER J. KING, OF MILWAUKEE, WISCONSIN.

APPARATUS FOR CUTTING PIPES.

Application filed April 26, 1921. Serial No. 464,670.

*To all whom it may concern:*

Be it known that I, PETER J. KING, a citizen of the United States, and resident of Milwaukee, in the county of Milwaukee and State of Wisconsin, have invented certain new and useful Improvements in Apparatus for Cutting Pipes; and I do hereby declare that the following is a full, clear, and exact description thereof.

My invention relates to an improved apparatus for cutting pipes, and is particularly useful where it is desired to cut a pipe which projects from a flat surface, and it is desired to cut it flush with said surface.

It is particularly useful, for example, in cutting soil pipe after the same has been set in position, and the floor laid around it.

In the process of installing the plumbing in modern houses, it has been customary to install the same including the soil pipe and subsequently to lay the tile floor with a cement foundation around the same. Hitherto it has been necessary to measure accurately the length of pipe to be used, in order to terminate at the level of the floor which is to be laid. This method required extreme accuracy, and moreover cement workers cannot be depended upon to lay the foundation for the floor at the exact height necessary to bring the floor accurately to the predetermined level.

It is the general object of my invention to provide an apparatus for cutting the pipe after the floor has been finished, thereby making it possible to cut the pipe accurately and smoothly at the surface of the floor.

In practicing the invention, therefore, the pipe will first be cut somewhat longer than it will ultimately be left.

In describing my invention reference will be had to the accompanying drawings, in which:

Figure 1 is a vertical sectional view through a soil pipe, which is being cut in accordance with my invention, and Figure 2 is a horizontal view looking upwardly from the line 2—2 of Figure 1.

The numeral 5 designates the end of a soil pipe, which has been left projecting upwardly above the cement or tile floor 6. In carrying out my invention, I provide a cylindrical plug which is made up of a plurality of sections 7, which together form a hollow cylinder which will normally be easily inserted within the pipe 5. These sections are provided with a plurality of circumferential grooves 8, within which are seated the springs 9. These springs are tensioned so as to exert an inward pressure on the sections 7. The plug is provided with a central tapered opening 10 extending axially therethrough, and within this opening fits a tapered core 11.

Mounted at one end of the cylinder is a sleeve 12, which is provided at its outer end with an abutting surface such as that provided by the flange 13. Extending centrally through the core 11 and the sleeve 12 is a bolt 14, provided at its outer end with the threaded portion 15. On this threaded portion is engaged a nut 16, which abuts the flange 13. Thus by turning the nut 16, the core 11 may be drawn into the cylindrical plug to expand the same. At the end of the threaded portion 15, I attach a member 17 of any suitable form for supporting or carrying the device.

After the floor has set and the pipe is to be cut the mechanic simply inserts the plug into the pipe to the position shown in Figure 1, and turns the nut 16 until the outer surface of the plug firmly engages the inside of the pipe. He may then cut the pipe with a hammer and cold chisel as shown at 18. During this process, the plug will absorb or damp the vibration of the pipe.

The core 11 may be secured to the bolt 14 by any suitable means, or, if desired, the bolt and core may be made in one integral piece. In order to obviate the possibility of the plug being lost in the pipe, it may also be found desirable to make either the nut 16 or the ring 17 larger than the diameter of the pipe. It will also be obvious that other minor modifications may be made in the structural details of the device, without departing from the spirit of the invention as set forth in the claim.

I claim as my invention:

A device for use in cutting drain pipe after such pipe has been secured in a projecting manner in a cemented floor, said device comprising a tapered conical member, a plurality of annular members together forming a substantially complete cylinder having an outer cylindrical surface adapted to contact with the inner surface of the pipe and having a conical inner surface contacting with said conical member, a threaded rod terminating in a suspension member adapted to be manually held, a sleeve slidably mounted upon said rod and bearing at one end against the annular member, and a wing nut threaded upon said rod and bearing against said sleeve, whereby said device may be freely lowered into said projecting pipe and thereafter the nut tightened to force said annular member into contact with the inner surface of said pipe to damp out vibration when said pipe is chiseled.

In testimony that I claim the foregoing I have hereunto set my hand at Milwaukee, in the county of Milwaukee and State of Wisconsin.

PETER J. KING.